United States Patent [19]

Leal-Diaz et al.

[11] 3,918,646

[45] Nov. 11, 1975

[54] IRRIGATION SYSTEMS BY TRICKLING

[76] Inventors: Jaime Leal-Diaz; Javier Rangel-Garza, both of Escobedo Sur 733, Suite 201, Monterrey, Nuevo Leon, Mexico

[22] Filed: Sept. 6, 1974

[21] Appl. No.: 503,910

[52] U.S. Cl................................. 239/271; 239/542
[51] Int. Cl.² ......................................... B05B 15/00
[58] Field of Search ............ 239/542, 229, 271, 272

[56] References Cited
UNITED STATES PATENTS

| | | | |
|---|---|---|---|
| 3,009,647 | 11/1961 | Hait | 239/229 |
| 3,009,648 | 11/1961 | Hait | 239/229 |
| 3,767,124 | 10/1973 | Spencer | 239/542 |
| 3,779,468 | 12/1973 | Spencer | 239/542 |
| 3,834,628 | 9/1974 | Selman | 239/542 |
| 3,840,182 | 10/1974 | Geffroy | 239/542 |
| 3,841,349 | 10/1974 | Todd | 239/542 |

*Primary Examiner*—Lloyd L. King
*Attorney, Agent, or Firm*—Laurence R. Brown

[57] ABSTRACT

The present invention refers to improvements to compensating water emitters and more specifically to means by which it is possible to have a control of water emission by drippers, sprinklers and other similar devices, taking advantage of the pressure exerted at a given time by the fluid in the supply line, which at the same time allows the duct and its accessories to clean itself.

6 Claims, 12 Drawing Figures

IRRIGATION SYSTEMS BY TRICKLING

The present invention refers to improvements to compensating water emitters and more specifically to means by which it is possible to have a control of water emission by drippers, sprinklers and other similar devices, taking advantage of the pressure exerted at a given time by the fluid in the supply line, which at the same time allows the duct and its accessories to clean itself.

The purpose of the present invention is to take advantage of said system preferably for agricultural irrigation and more specifically for trickle irrigation, sprinkling and the like, providing simple, practical and efficient means for self cleaning and a regularity in the discharge flow of the emitters, independent to a certain degree of the pressure and fluidity which at a given moment may exist in the irrigation water.

Another of the purposes of the present invention is to allow the manufacture of the elements of emitting regulators through the combination of relatively simple pieces, unlike those presently in existence which demand more complicated manufacturing.

In the same way, the present invention brings forth as advantages among others, the ability to couple the compensating emitters to the supply line without need for additional supporting elements. Also due to the final placing of the compensating emitters in the supply line it is possible to have a solid and secure connection. This makes possible the assembly of the components of the irrigation lines outside the place where these shall remain set up.

As an additional consequence of the present invention it is possible to place a great part of the emitting regulator unit within the conducting line, in such a manner that upon moving said conduction line with the compensating emitters already coupled, there do not exist obstacles which at a given moment could mean a problem of any kind.

The characteristic details of the present invention are shown clearly in the following description and in the accompanying drawings as an illustrated example of it, using the same parts in the several reference symbols to indicate the same figures shown.

Figure 1:
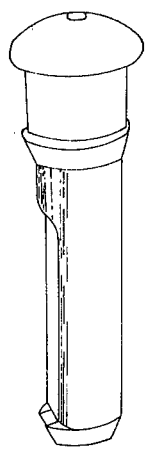
FIG. 1 shows a perspective view of a compensating emitter.
Figure 2:
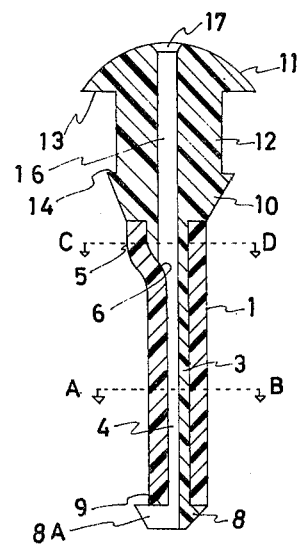
FIG. 2 shows a longitudinal cross section view of a compensating emitter.
Figure 3:
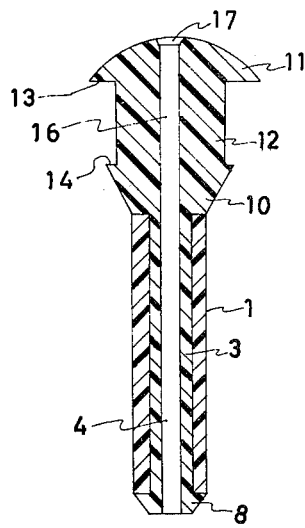
FIG. 3 shows a longitudinal cross section view perpendicular to the one mentioned in FIG. 2.
Figure 4:
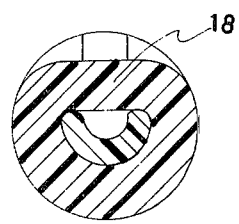
FIG. 4 shows a cross section view of a compensating emitter as shown by line A–B of FIG. 2.
Figure 5:
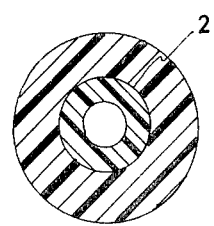
FIG. 5 shows a cross section view of a compensating emitter in section C–D as shown in FIG. 1.
Figure 6:
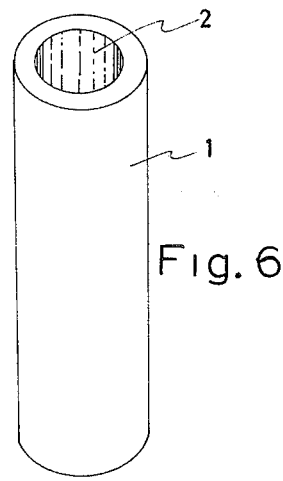
FIG. 6 shows a perspective view of a female section.
Figure 7:
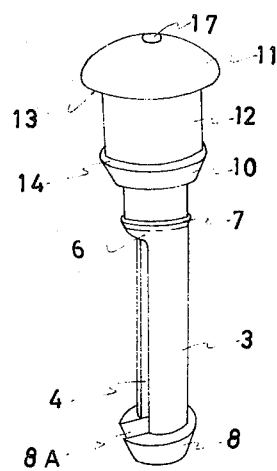
FIG. 7 shows a perspective view of a male section embodiment.
Figure 8:
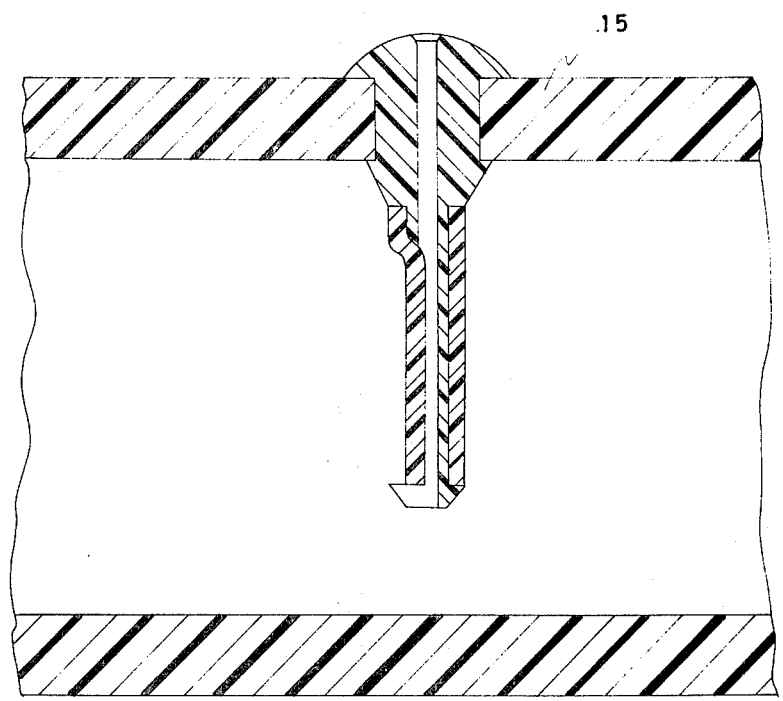
FIG. 8 shows a cross section view of the conducting line and compensating emitter joined.
Figure 9:
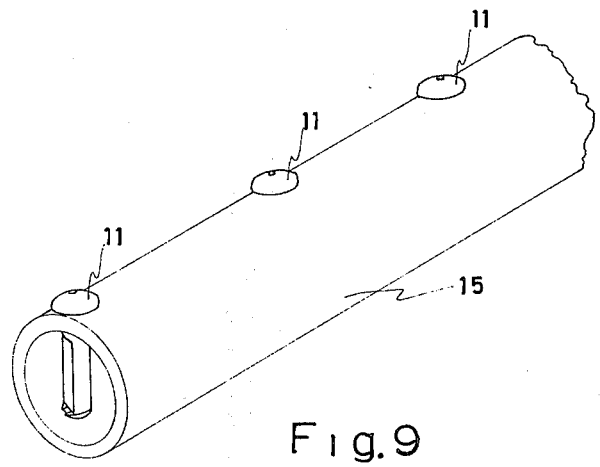
FIG. 9 shows an isometric view of the conducting line and compensating emitters joined.

With reference to said figures, these compensating emitters are formed by the combination of a female section 1 manufactured of elastic material, in the interior of which is found a cavity 2 within which the stem 3 of the male section is housed allowing the female section 1 to cover the channel 4 and in its upper part 5 the crown 6 sealing it and creating a duct 16 within the female section 1 and the channel 4 whose entry is at the base 8 (FIGS. 7 & 2) of the stem 3 of the male section and whose outlet 17 may vary its shape depending on its purpose, be it for trickle irrigation, sprinkling or the like.

The male section is made up by the combination of a base 8 (FIGS. 7 & 2) which can have a lower channel 8A which serves as entrance for the fluid, serving besides said base 8 to secure the female section 1, once the stem 3 has been inserted in the cavity 2 so the lower part 9 of the female section remains resting on the base 8 and unable to dislodge itself from the male section.

A stem 3 which in its lower part has a channel 4 and in its upper part a crown 6 through which the union of the female section 1 and the stem 3 is sealed this avoiding the entry or exit of the fluid through the upper part of the female section 1.

The crown 6 may or may not have a retaining ring 7 which in that case will aid to keep the female section superposed on the crown 6.

In its upper part, by means of the crown 6, the stem 3 is joined to the seat 10 the neck 12 and the head 11 which have as another purpose in combination with the base 13 of the head 11 and the cover 14 of the seat 10 to seal and secure the union between the conduction line 15 and the rest of the compensating emitter.

In the interior of the head 11, neck 12, seat 10 and the crown 6 there is a duct 16 which below the lower limit of the crown 6 becomes a channel 4 which goes to the base 8 in the understanding that when the female and male sections are joined, the water shall penetrate through the lower channel 8A in the base 8 of the stem 3 to then displace itself due to the duct 16 which has been formed by the female section 1 and the channel 4 all along the male section to the exit 17 of the head 11.

It is obvious that because of the elasticity of the female section 1 as the gradient of hydraulic pressure increases between the interior and exterior of the compensating emitter it will have a tendency in its open area 18 to lodge inside the channel 4 from which would result a reduction in the conduction area along the channel 4 and therefore a regulating action of the water flow.

When the gradient of hydraulic pressure decreases between the interior and the exterior, the female section 1 expands and those particles which could have gone into the channel 4 are freed and expelled. This mechanism allows self cleaning of the compensating emitter.

By reason of the design and coupling manner, it is possible in case it is needed to clean the compensating emitter with only inserting an instrument along the duct 16. When the circumstances require it shall be possible to extract the unit to replace it totally or partially.

Figure 10:
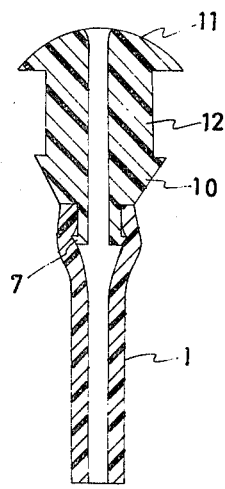
FIG. 10 shows a cross section view of a compensating emitter with short stem.

It is possible for the compensating emitter to have a short stem (FIG. 10) in such circumstances the crown 6 will form the stem itself 3 and the retaining ring 7 will aid to support firmly the female section.

Figure 11:
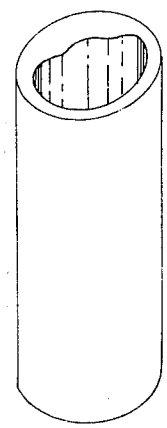
FIG. 11 is a conventional view of the female section which shows one of the forms the cavity can have when the male section has the short stem.
Figure 12:
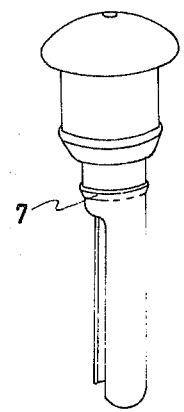
FIG. 12 shows a conventional view of a male section without a base.

It is possible that in case of short stems (FIG. 10) the female section (FIG. 11) be the one to provide, because of its structure and form, the necessary means to flex itself, thus reducing its cavity, when the degree of pressure force it to do so, being in this case channel and duct; in such circumstances the functioning of the compensating emitter will be the same as the one produced when a long stem is part of it.

It is not the intention of my principals to limit the extent of their invention to the accompanying figures, nor precisely to the forms described, but to claim for them all mechanisms which using the described principles, produce the said industrial results.

What is claimed is:

1. A two piece water emitter adapted for mounting primarily inside a hollow conduction line with a confining wall with an outlet port member positioned near the exterior surface of the conduction line for discharge of water, and an entrance port positioned inside said line, comprising in combination, a stiff male member having said outlet as the head thereof for discharging fluid, a fitting for engaging said wall of said conduction line to hold said member in place therein with said head substantially flush with said confining wall and with a stiff stem portion defining a water conveyance duct therethrough for extending inside said hollow line to convey fluids through said confining wall, and an elastic generally cylindrical female section for fitting snugly around a portion of said stem to form a wall portion of said fluid conveying duct therein and extend substantially radially into said line and wherein fluid entrance and exit ports extend from opposite ends of said female member.

2. The emitter defined in claim 1, wherein the stem forms a part of said duct and said female member a further part and elasticity of said female member flexes as a function of hydraulic pressure to change the size of the flow path through said conveying duct.

3. The emitter defined in claim 1, wherein said stem portion has a base and a crown for engaging said female member at opposite ends thereof, said crown sealing the duct by engagement with said female member to prevent leakage external to said duct and said base engaging said female member to hold it in position in sealing engagement with said crown.

4. The emitter defined in claim 3, wherein said base defines an entrance port for receiving fluid from said conduction line, with the entire stem portion and female member positioned substantially radially inside said conduction line so that an instrument can be inserted from outside said condution line to clean said duct.

5. The emitter defined in claim 1, wherein said crown has a retaining ring for engaging said female member to hold it in place.

6. The emitter defined in claim 5, wherein said male member extends into one end of said female member and only partly through said duct walls defined by said female member.

* * * * *